United States Patent [19]

Rónaföldi et al.

[11] Patent Number: 4,615,660

[45] Date of Patent: Oct. 7, 1986

[54] ELECTROMAGNETIC METAL MELT PUMP FOR PUMPING OUT AND CHARGING THE MOLTEN METAL FROM A FURNACE

[75] Inventors: Arnold Rónaföldi, Miskolc; József Ferencsik, Budapest; János Doknás; László Török, both of Vác, all of Hungary

[73] Assignee: Nikex Nehézipari Külkereskedelmi Vállalat, Budapest, Hungary

[21] Appl. No.: 777,852

[22] Filed: Sep. 18, 1985

Related U.S. Application Data

[63] Continuation of Ser. No. 605,342, Apr. 30, 1984, abandoned.

[30] Foreign Application Priority Data

May 4, 1983 [HU] Hungary ............................ 1519/83

[51] Int. Cl.⁴ ........................................... H02K 44/02
[52] U.S. Cl. ...................................... 417/50; 266/237; 222/594
[58] Field of Search .................. 417/50; 266/237; 222/593, 594, 595, 604

[56] References Cited

U.S. PATENT DOCUMENTS

| | | | |
|---|---|---|---|
| 2,552,876 | 5/1951 | Tama | 417/50 X |
| 2,755,327 | 7/1956 | Tama | 417/50 X |
| 2,937,789 | 5/1960 | Tama | 266/237 X |
| 3,453,460 | 7/1969 | Butler et al. | 417/50 X |
| 3,472,942 | 10/1969 | Campbell | 222/593 X |
| 3,864,061 | 2/1975 | Carbonnel et al. | 417/50 |
| 4,398,589 | 8/1983 | Eldred | 417/50 X |

FOREIGN PATENT DOCUMENTS

| | | | |
|---|---|---|---|
| 248041 | 7/1966 | Austria | 222/594 |
| 1018887 | 11/1957 | Fed. Rep. of Germany | 417/50 |
| 2304257 | 2/1974 | Fed. Rep. of Germany | 417/50 |
| 882973 | 3/1943 | France | 222/595 |
| 933241 | 6/1982 | U.S.S.R. | 222/604 |

OTHER PUBLICATIONS

*Giesserie,* 69, GFR, No. 20, Sep. 27, 1982, pp. 575–579.

*Primary Examiner*—William L. Freeh
*Assistant Examiner*—Paul F. Neils
*Attorney, Agent, or Firm*—Gabriel P. Katona

[57] ABSTRACT

An electromagnetic metal melt pump for pumping and delivery molten metal from a furnace, having a ground plate, an inductor attached to the ground plate, an inductor attached to the ground plate and including a laminated iron body having slots in which a multiphase winding is placed. A metal melt tank made of magnetizable material is provided with heat insulation and is attached to the laminated iron body. A suction tube (7) is coaxially placed in the metal melt tank (3), the suction tube (7) comprises three main parts: the first part is a suction tube (7c) having a volume ($V_4$) for closing the magnetic circuit of the inductor between points A and B which determine the immersing depth; the second part is a buffer tank (7b) having a volume ($V_1$) to produce a reduced pressure space between points B and C; the third part is a suction tube (7a) having a volume ($V_2$) for creating a reduced pressure in the suction tube (7) immersed into the metal melt of the furnace. The suction tube (7) is provided with controllable heaters (7d) and with heat insulation (7e). The ground plate (1) is fixed on a lever and tilting plate of a lever equipment (8a). The suction tube (7) is attached to a lever rod (8b) of the lever equipment (8), the lever rod (8b) can be rotated around its axis (FIG. 1).

2 Claims, 2 Drawing Figures

ELECTROMAGNETIC METAL MELT PUMP FOR PUMPING OUT AND CHARGING THE MOLTEN METAL FROM A FURNACE

This is a continuation application of application Ser. No. 605,342, filed on Apr. 30, 1984, now abandoned.

FIELD AND BACKGROUND OF THE INVENTION

The invention relates generally to an electromagnetic metal melt pump for pumping out and charging the molten metal from a furnace. The metals used in the furnace are, for example, zinc, tin, lead and, in some cases, aluminum, or alloys of these metals.

The invention is concerned more particularly with the pumping out and charging of such metals from the melting or heat storing furnace without the necessity of submerging the pump-body (inductor), supplied with electric windings, into the furnace. The removal of the melt using the pump according to the present invention and the charging step is accomplished in that into the melt, placed in the furnace, only a single suction snout is immersed, the cross section of which is relatively small in comparison with the opening of the furnace.

Several types of electromagnetic metal melt pumps used for the delivery of the melt and for charging such melt from the furnace, are known.

The German Pat. No. 2,304,257 describes such known solution, which is characterized in that at least one part of the pump must be emerged into the melt of the furnace, causing, thereby, an increased thermoloading for the windings of the pump. Such solution cannot be used with furnaces having a narrow opening, because the part of the pump which is to be immersed into the melt, cannot get into the furnace through its opening.

Another solution also directed to the delivery of metal melts using electromagnetic pumps is described in the periodical "Giesserie 69" (GFR, No. 20, Sept. 27, 1982, pages 575–579). According to the last mentioned proposal, the pump is not directly introduced into the metal melt, but it is directly connected to the furnace. For the operation of such pump with a closed furnace, inert gas pressure is used and must be increased by means of an auxiliary outside equipment in order to force the melt into the pump. This requirement can be fulfilled only by the use of a pressure tight furnace, which makes the furnace construction very expensive. During interruption of the delivery, the pump drops the metal melt. Such dropping of the metal melt can be avoided by the use of a foot valve, or by energizing the pump with a predetermined power. To produce a special foot valve for metal melts, is not a simple task, because an adequate enerization of the pump may easily have the consequence, that the metal melt becomes overheated.

The common advantage of the electromagnetic metal pumps is that no moving structural components should be used. The power necessary for the delivery of the metal melt is produced by the electromagnetic field. If the drawbacks of the prior art pumps could be eliminated, the field of application for the electromagnetic metal pumps could be considerably enlarged, and thereby simpler, less expensive and safer and more economical metal melt pumps could be produced.

OBJECTS AND SUMMARY OF THE INVENTION

The object of the present invention is to create a pump construction, according to which for the operation of the pump the wound inductor of the pump should not be immersed into the metal melt, and no auxiliary equipment is necessary to prevent the metal melt on each delivery cycle from getting into the active zone of the pump.

The construction of the electromagnetic pump according to the present invention provides the advantage that only a suction tube having a small cross-section should be immersed into the metal melt. Due to such structural advantage, the wound inductor of the pump can be spaced from the furnace at a place within the shop, the temperature of which is equal to the atmospheric temperature. According to the present invention, the electromagnetic pump removes and delivers the metal melt from the furnace from a depth, the level of which depends on the atmospheric pressure and on the density of the metal melt.

It is clear that before the set-up procedure, the structural elements of the pump which come into contact with the metal melt, should be heated up to the melting temperature of the metal melt. Such heating step is carried out by the installed heaters and by the inductive heating effect of the inductor itself.

The evacuation needed if the suction is to be carried out before the set-up procedure after the heating process has taken place, in a manner that the pump is to be filled up only once, but after the set-up procedure the evacuation is produced by the pump itself without any use of moving parts. After stopping the removal or delivery cycle, the pump may continue the removal cycle by a renewed excitation of the inductor. The delivery intensity can be varied by the inductor excitation.

The electromagnetic pump according to the present invention with a suitable construction may be used also for the operation of more than one furnace.

A subject matter of the invention is an electromagnetic metal melt pump. The pump before the set-up process is to be heated and filled up only once, and after such set-up it produces the necessary evacuation after the sucking tube has been immersed into the furnace containing the metal melt. The metal melt is removed and delivered from a depth depending from the density of the metal melt and from the atmospheric pressure.

The electromagnetic pump for sucking and delivering the metal melt from a furnace comprises a ground plate, a housing, a laminated iron body, all fixed to the ground plate. In the slots of the iron body multiphase windings are placed thereby forming an inductor. A metal melt tank made of magnetizable material and provided with heat insulation is attached to the iron body.

According to the invention a suction tube is placed coaxially in the metal melt tank, comprising three main parts. The first one is a tube having a volume closing the magnetic circuit of the inductor between points determining the immersion depth. The second one is a buffer tank having a volume capable of forming evacuation or reduced air pressure between said points. The third one is a suction tube having a volume capable of producing a reduced pressure when it is immersed into the molten metal. The suction tube is provided with controlled heaters and heat insulation. The ground plate is mounted onto the lifting and tipping plate of a lever apparatus. The suction tube is attached to a lifting rod of the lever equipment, wherein the lifting rod can be rotated around its axis.

According to a preferred embodiment of the invention, the suction tube comprises a distance buffer which determines the immersing depth into the melted metal of the furnace.

According to a further preferred embodiment of the invention the auxiliary lever equipment can be lifted with its lifting plate simultaneously.

DESCRIPTION OF THE PREFERRED EMBODIMENTS

Figure 1:
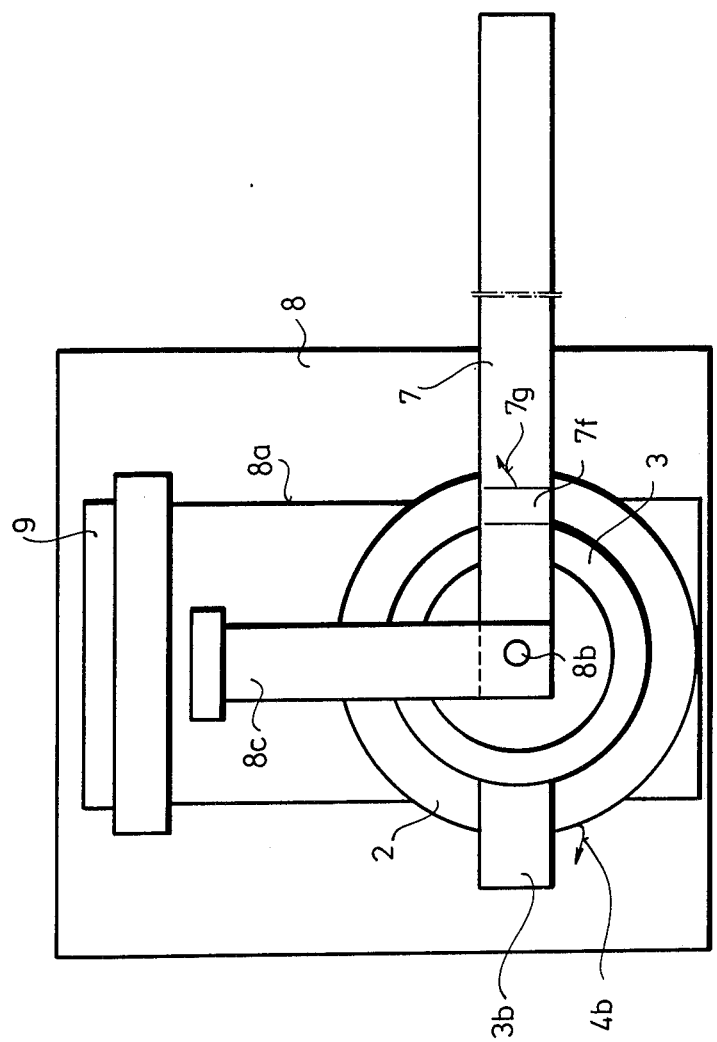
FIG. 1 shows a plan view of an embodiment of the electromagnetic metal melt pump according to the invention.
Figure 2:
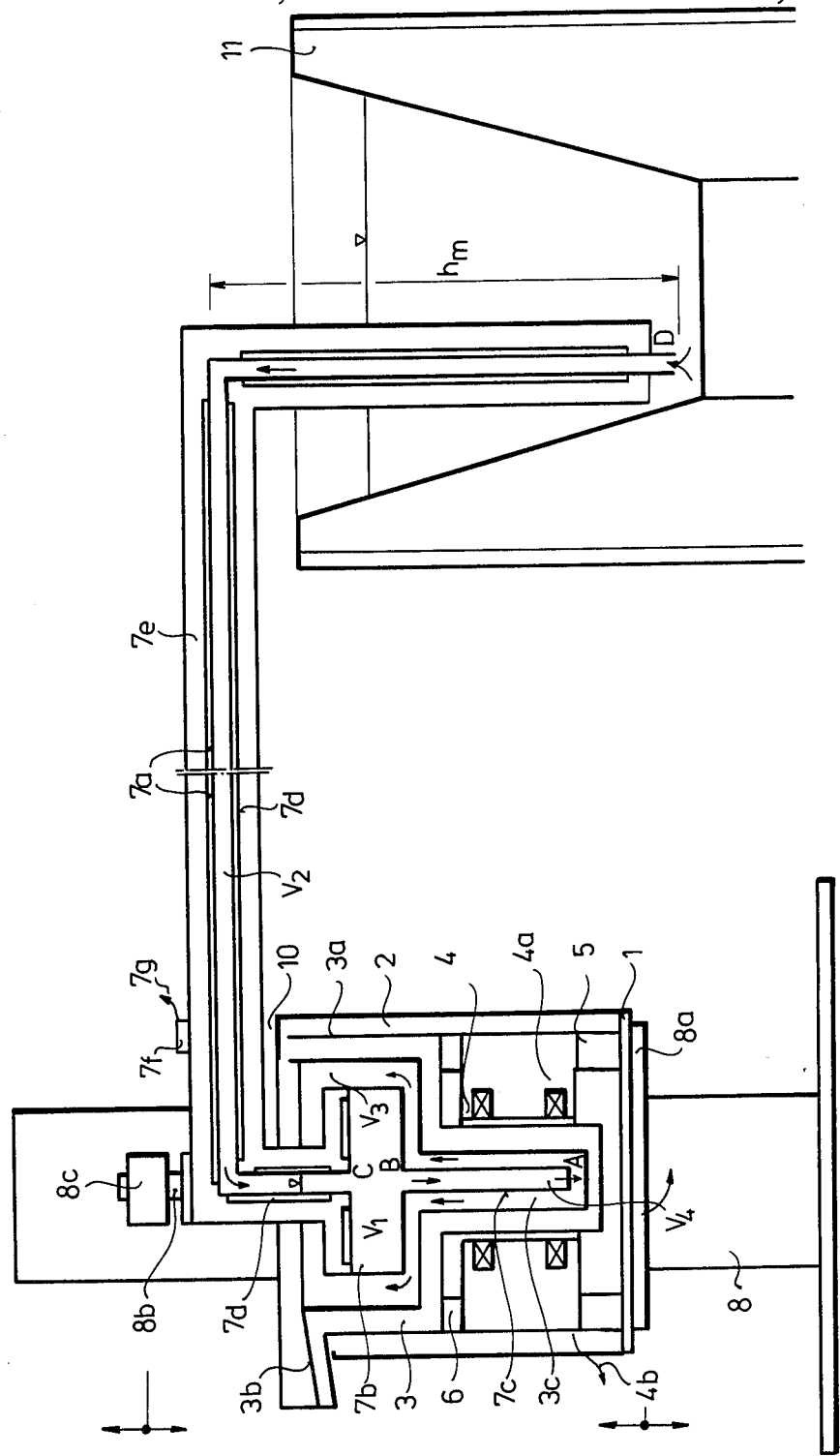
FIG. 2 shows a front view of the metal melt pump of FIG. 1 and of a pot furnace schemetically.

As illustrated in FIGS. 1 and 2 a housing 2, and an inductor made from a laminated iron body 4 and of a multiphase windings 4a placed in slots of the iron body are fixed to a ground plate 1 by retainers 5. A metal melt tank 3 made from dia- or paramagnetic material having a cylindrical shape, is provided with heat insulation 3a and is attached to the laminated iron body 4 by fixing elements 6. The inductor comprising of the laminated iron body 4 and windings 4a is supplied with electric current by an air-cable 4b. A suction tube 7 is placed coaxially into the metal melt tank 3 having a distance buffer 10 determining the immersing depth of the ferromagnetic tube 7c between the points A and B.

The suction tube 7 comprises three main parts:

1. The tube 7c placed between the points A and B with the volume $V_4$ has the task to close the magnetic circuit of the inductor to prevent thereby the magnetic field of the inductor from getting into the volume $V_4$;

2. A buffer tank 7b between the points B and C having an inner volume of $V_1$ forms an air reduction-space when it becomes emptied, if in its filled up state the point D of the suction tube is in the position below the surface of the melted metal in the furnace.

3. The suction tube 7a between the points C and D has an inner volume $V_2$. The point D lies during operation below the surface of the metal melt in the pot furnace 11.

For sake of temperature storage and heating the suction tube 7 is provided with thermocontrolled heaters 7d and heat insulation 7e. The heaters 7d are energized via an electric distribution box by an air-cable 7g with electric current. The ground plate 1 is mounted onto the lever and tipping plate 8a of an elevator 8. The suction tube 7 is connected to a lever rod 8b of the lever equipment 8. The lever rod 8b can be rotated about its axis in the auxiliary lever means 8c. The auxiliary lever means 8c can be lifted with the lever plate 8a simultaneously.

The complete electromagnetic pump is controlled by control equipment placed into a control box 9. The construction of the control box 9 is known per se. The air-cables 4b and 7g are attached to such control desk 9 as well.

The set-up procedure and the function of the pump according to the invention is as follows:

On the first step the tank 3 of the pump is heated, then the tank is filled with metal melt up to the surface of the pouring opening 3b. The point D of the suction tube 7 at this position is not yet within the furance. Thereafter the ground plate 1 is lifted by means of the lever plate 8a of the lifting equipment 8 together with the auxiliary lever 8c and the suction tube 7, both being on the ground plate 1. The point D of the suction tube 7 will be rotated toward the furnace around the axis of the lever rod 8b, thereafter the ground plate 1, the auxiliary lever 8c and the suction tube 7 is lowered. As a result, the point D of the suction tube 7 gets below the level of the metal melt in the furance.

When an alternating current is connected to the windings 4a of the inductor comprising the elements 4 and 4a, and wherein the number of the phases corresponds to that of the windings, the inductor creates an electromagnetic field moving from the bottom upwards and radially oriented in the space between the suction tube 7c and the bottom of the melt tank 3. Such electromagnetic field induces in this space an alternating potential within the metal melt in this space. Due to such induced current eddy currents are generated in space 3c. As a result of the mutual effect of the eddy currents and of the magnetic field of the windings 4a, the metal in space 3c starts to move upwards, draining the volume $V_1$. Thus the removal of the metal melt through the discharge opening 3b will commence.

In the course of the emptying of the volume $V_1$, a pressure reduction is created in volumes $V_1$ and $V_2$ and, due to this effect, the metal melt flows from the furnace into the suction tube 7 at point D.

The proportion of the volumes $V_1$ and $V_2$ is to be selected to satify the following inequality:

$$p_o\left(\frac{V_2}{V_1 + V_2}\right) > \gamma_f h_m + p_v$$

wherein
$p_o$=the atmospheric pressure;
$\gamma_f$=the density of the metal melt;
$p_v$=the streaming losses;
$h_m$=D value which can be taken from FIG. 2.

Upon discontinuing the excitation of the coil windings 4a, the volume $V_1$ becomes refilled with the metal melt of the volume $V_3$, consequently the geometrical dimensions of tank 7 should be selected so that the inequality $V_3 > V_1 + V_4$ should be true. Upon energizing on the windings 4a again, the pump will first fill the volume $V_3$, and thereafter begins the removal step. It can be seen that the removal cycles are repeating themselves again.

If we want to finish the work of the furnace after its suction has been completed, then the suction tube 7 will be lifted from the tank 3 by means of the auxiliary lever 8c until the point A gets above the housing. The rest of the metal melt can be tilted out from the tank 3 by means of the lifting and tilting plate 8a. Having the lifting and tilting plate 8a retilted, the suction tube 7 is already empty and can be returned into the tank 3 by means of the auxiliary lever 8c.

The embodiment of the invention described above represents only an examplary realization of the invention. Within the scope of the attached claims numerous further embodiments can be constructed without departing from the spirit of the invention.

What we claim is:

1. Electromagnetic metal melt pump for pumping out and delivering a molten metal from a furnace, comprising a ground plate and including a laminated iron body having slots, multiphase windings placed into said slots and forming an inductor; a metal melt tank made of magnetizable material, heat insulation provided on said tank, said tank is attached to said laminated body, a suction tube (7) is coaxially placed in said metal melt tank (3), said suction tube (7) comprises a first suction tube (7c) having a volume ($V_4$) for closing the magnetic circuit of the inductor on a section defined by a set of points A and B and determining an immersing depth; a second buffer tank section (7b) having a volume ($V_1$) for producing a reduced pressure area defined by a set of points B and C; a third suction tube (7a) having a volume ($V_2$) for creating a reduced pressure in the suction tube (7) when immersed into the metal melt of the furnace; said suction tube (7) is provided with controllable heaters (7d) and with heat insulation (7e); said ground plate (1) being fixed on a lever plate (8a) of lever equipment (8); said suction tube (7) is attached to a lever rod (8b) of said lever equipment (8), the lever rod (8b) is mounted for rotation about the axis thereof.

2. Electromagnetic metal melt pump according to claim 1, characterized in that the suction tube (7) comprises a spacing buffer (10) for determining the immersing depth.

* * * * *